(12) United States Patent
Xie (10) Patent No.: US 7,246,899 B2
(45) Date of Patent: Jul. 24, 2007

(54) DETACHABLE SHELTER FRAME FOR SPECTACLES

(76) Inventor: Yiling Xie, 1009 Arcadia Ave., Suite 3, Arcadia, CA (US) 91007

( * ) Notice: Subject to any disclaimer, the term of this patent is extended or adjusted under 35 U.S.C. 154(b) by 0 days.

(21) Appl. No.: 11/246,413

(22) Filed: Oct. 6, 2005

(65) Prior Publication Data

US 2007/0081120 A1     Apr. 12, 2007

(51) Int. Cl.
 *G02C 9/00*   (2006.01)
(52) U.S. Cl. ........................... 351/47; 351/57
(58) Field of Classification Search .......... 351/47, 351/57, 48, 58, 44, 41, 158
See application file for complete search history.

(56) References Cited

U.S. PATENT DOCUMENTS 6,231,180 B1 *  5/2001  Xie ............................. 351/47
6,341,864 B1 *  1/2002  Ng ............................... 351/47
6,464,352 B1 * 10/2002  Xie ............................. 351/47

* cited by examiner

*Primary Examiner*—Hung Xuan Dang
(74) *Attorney, Agent, or Firm*—Raymond Y. Chan; David and Raymond Patent Group (57) ABSTRACT

A detachable shelter frame for mounting in front of a primary spectacles frame which includes a frame body mounting two lenses in position, wherein the detachable shelter frame includes two auxiliary lenses, a shelter bridge, and two resilient mounting devices. The resilient mounting devices are spacedly provided at the shelter frame for detachably mounting the shelter frame in front of the primary spectacles frame, wherein each of the resilient mounting devices includes a resilient arm extended from the shelter bridge and an engaging member. The engaging member is extended from the resilient arm for pressing against the rear surface of the respective lens of the primary spectacles frame in such a manner that the two resilient arms substantially pull the two engaging members towards the primary spectacles frame for mounting the shelter frame in front of the primary spectacles frame.

6 Claims, 8 Drawing Sheets

DETACHABLE SHELTER FRAME FOR SPECTACLES

BACKGROUND OF THE PRESENT INVENTION

1. Field of Invention

The present invention relates to spectacles frame, and more particularly to a detachable shelter frame with auxiliary lenses for the spectacles frame, wherein the detachable shelter frame is adapted for mounting on a primary spectacle frame by a resilient engaging arrangement.

2. Description of Related Arts

Shelter frames are widely used today. A conventional shelter frame such as clip-on sunglasses comprises a plurality of clipping claws for detachably mounting on short-sighted or farsighted eyeglasses so that the wearer does not need to carry and pay for another pair of shortsighted or farsighted sunglasses. However, the metal made clipping claws may scratch the lenses of the primary eyeglasses during the mounting process because very often, the metal made clipping claw will exert an excessively urging force towards the primary eyeglasses so as to damage the lenses. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problems of the above mentioned clip-on sunglasses, magnetic attachment is recently introduced into the eyeglasses industry. A primary pair of magnet members is affixed on two upper side extensions of a primary spectacle frame respectively. A shelter frame such as a sunglasses includes a pair of arms for supporting on the upper side extensions for preventing the shelter frame from moving downward relative to the primary spectacle frame and an auxiliary pair of magnet members connected to the arms respectively for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Thus, the major drawback of the eyeglasses equipped with the magnet attachment is that the primary spectacle frame needs to be altered its original structural design in order to affix the magnet members thereon. So, the wearer may have to buy a pair of spectacle frames including a primary eyeglasses and an auxiliary sunglasses, which is much expensive than that the wearer needs to buy the clip-on sunglasses only. Moreover, a pair of primary magnet members is always located in front of the user's eyes.

SUMMARY OF THE PRESENT INVENTION

A main object of the present invention is to provide a detachable shelter frame for spectacles, wherein the detachable shelter frame can be precisely and easily attached on a primary spectacles frame by a resilient mounting device so as to securely mount on the primary spectacle frame without the use of any magnet and the risk of scratching the lenses by the resilient mounting device.

Another object of the present invention is to provide a detachable shelter frame for spectacles, wherein at least two resilient arms of the shelter frame are arranged to engage with the two lenses of the primary spectacles frame in a non-destructive and flexible manner, so as to prevent up and down movement or sideward movement of the shelter frame with respect to the primary spectacle frame.

Another object of the present invention is to provide a detachable shelter frame for spectacles, wherein the wearer may merely use one hand to attach or detach the shelter frame during exercising or driving.

Another object of the present invention is to provide a detachable shelter frame for spectacles that is adapted to be mounted on all kinds of the primary spectacle frame because no specific modification is required for the primary spectacle frame to adapted the shelter frame.

Another object of the present invention is to provide a detachable shelter frame for spectacles, which does not require changing of the original structural design of the primary spectacle frame, so as to minimize the purchasing cost for the users.

Accordingly, in order to accomplish the above objects, the present invention provides a detachable shelter frame for mounting in front of a primary spectacles frame which comprises a frame body mounting two lenses in position, wherein the detachable shelter frame comprises:

two auxiliary lenses;

a shelter frame supporting the two auxiliary lenses in position; and two resilient mounting devices spacedly provided at the shelter frame for detachably mounting the shelter frame in front of the primary spectacles frame, wherein each of the resilient mounting devices comprises:

a resilient arm rearwardly extended from the shelter frame to a rear position of the respective lens of the primary spectacle frame, and an engaging member which is extended from the resilient arm for pressing against a rear surface of the respective lens of the primary spectacles in such a manner that the two resilient arms substantially pull the two engaging members towards the primary spectacles frame so as to apply an urging pressure against the primary spectacles frame for holding the frame body of the primary spectacles frame between the shelter frame and the engaging members, so as to securely mounting the shelter frame in front of the primary spectacles frame.

These and other objectives, features, and advantages of the present invention will become apparent from the following detailed description, the accompanying drawings, and the appended claims.

DETAILED DESCRIPTION OF THE PREFERRED EMBODIMENT

Figure 1:
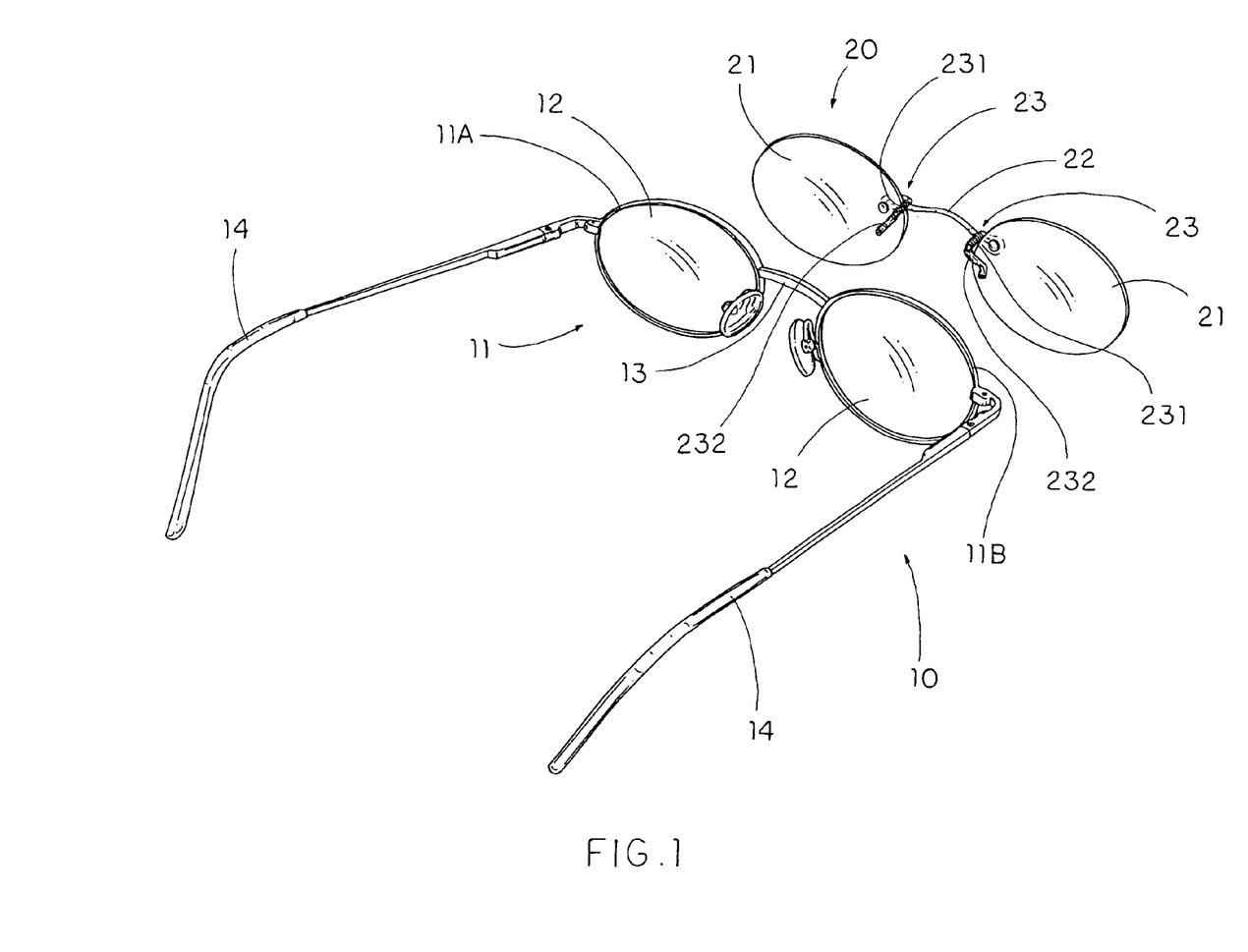
FIG. 1 is an exploded perspective view of a primary spectacles frame and a detachable shelter frame according to a preferred embodiment of the present invention.
Figure 2:
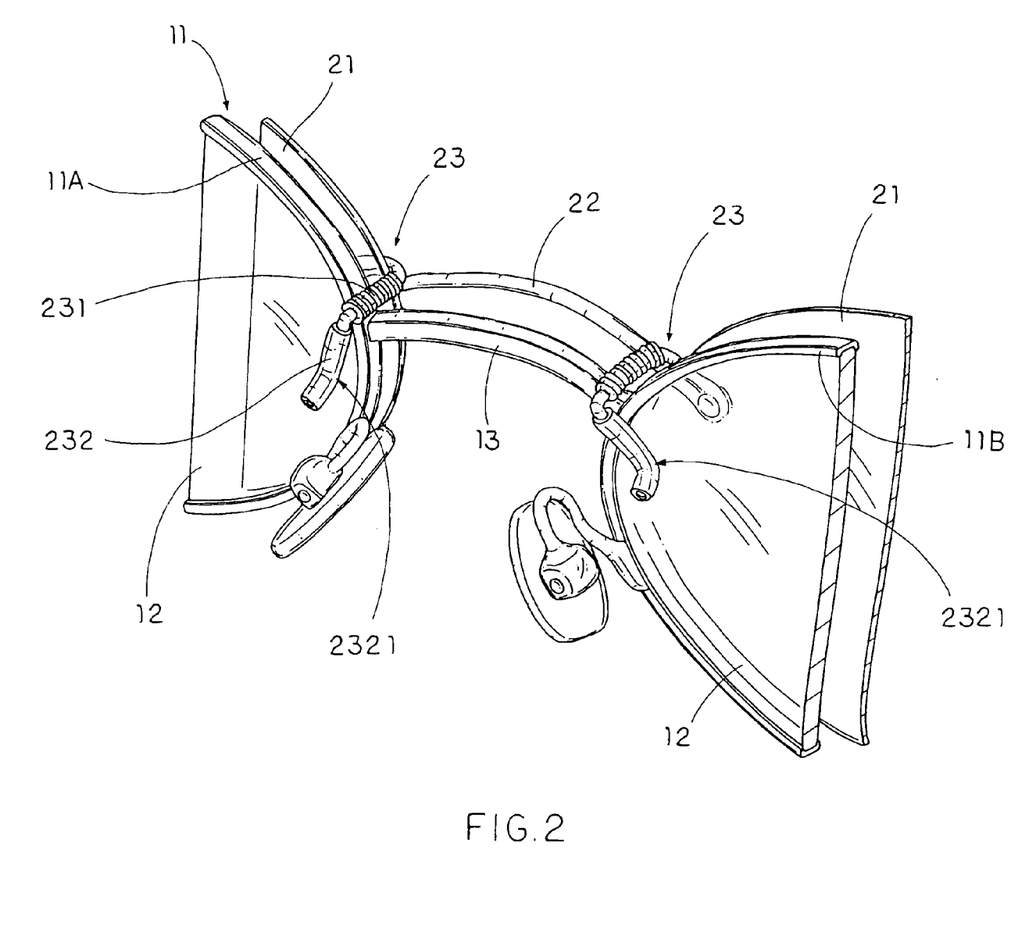
FIG. 2 is a perspective view of the primary spectacles frame and the detachable shelter frame according to the above preferred embodiment of the present invention.
Figure 3:
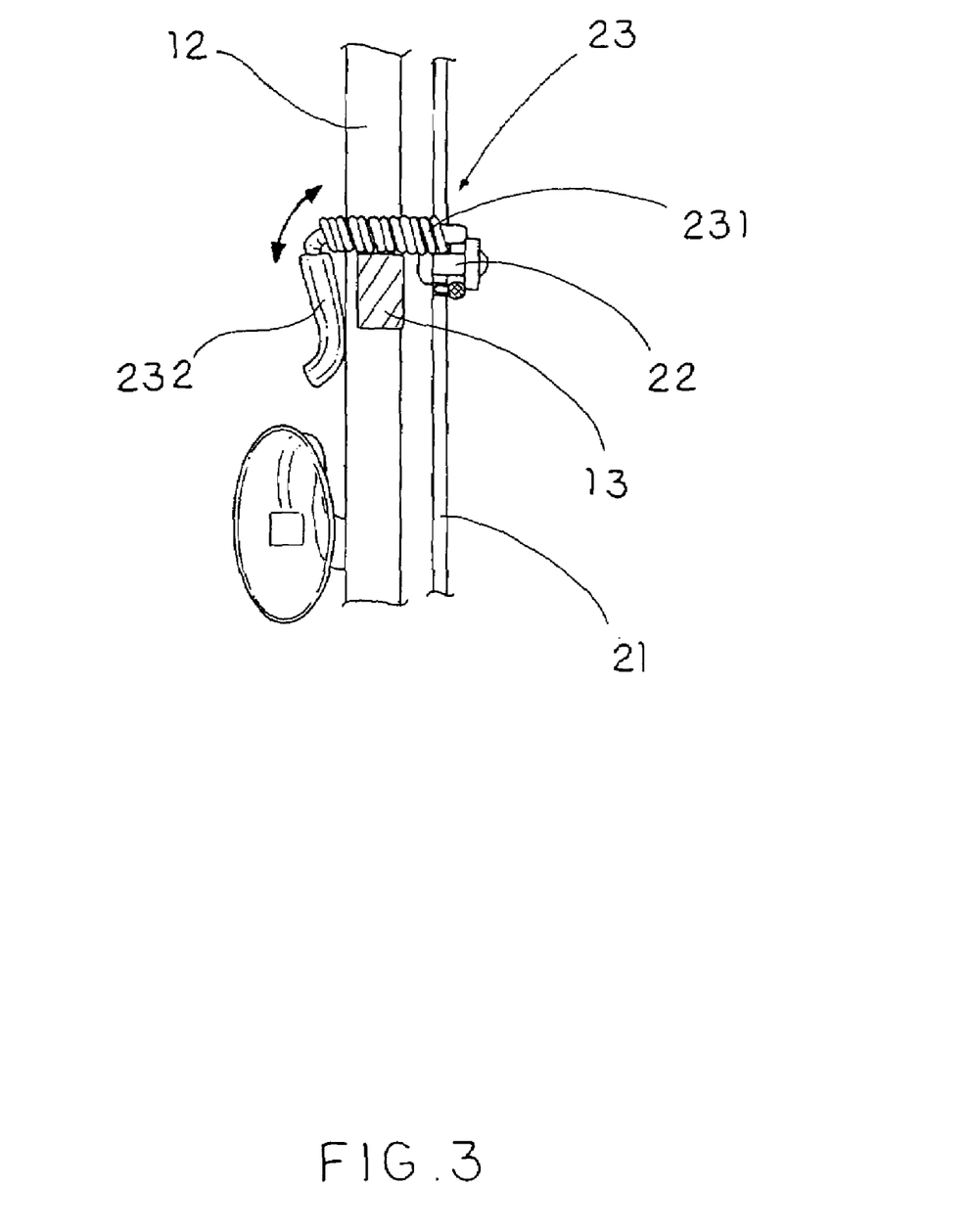
FIG. 3 is a sectional side view of the primary spectacles frame and the detachable shelter frame according to the above preferred embodiment of the present invention.

Referring to FIG. 1 to FIG. 3 of the drawings, a detachable shelter frame 20 according to a preferred embodiment of the present invention is illustrated, in which the shelter frame 20 is for mounting in front of a primary spectacles frame 10 which comprises a frame body 11 mounting two lenses 12 in position. According to the preferred embodiment, the detachable shelter frame 20 comprises two auxiliary lenses 21, a shelter bridge 22 supporting the two auxiliary lenses 21 in position, and two resilient mounting devices 23.

The two resilient mounting devices 23 are spacedly provided at the shelter frame 20 for detachably mounting the shelter frame 20 in front of the primary spectacles frame 10, wherein each of the resilient mounting devices 23 comprises a resilient arm 231 and an engaging member 232.

The resilient arm 231 is rearwardly extended from the shelter frame 20 to a rear position of the respective lens 12 of the primary spectacle frame 10.

The engaging member 232 is extended from the resilient arm 231 for pressing against a rear surface of the respective lens 12 of the primary spectacles frame 10 in such a manner that the two resilient arms 231 substantially pull the two engaging members 232 towards the primary spectacles frame 10 so as to apply an urging pressure against the primary spectacles frame 10 for holding the frame body 11 of the primary spectacles frame 10 between the shelter frame 20 and the engaging members 232, so as to securely mounting the shelter frame 20 in front of the primary spectacles frame 10.

Practically, the frame body 11 can be constructed as a conventional spectacles frame to have a pair of lens rims 11A, 11B as shown in FIG. 1 of the drawings, or a rimless frame that the primary bridge 13 and the two side extensions 14 are directly fastened to the edges of the two lenses 12. In other words, the primary spectacles frame 10 does not require modifying its original structure for mounting the detachable shelter frame 20 thereon. So, the detachable shelter frame 20 of the present invention fits for all kinds of conventional primary spectacles frame 10. In other words, the user does not need to buy a set of expensive primary spectacle frame and corresponding shelter frame. The user can merely additionally purchase a shelter frame 20 of the present invention to fit his or her current spectacle frame that he or she has originally.

According to the first preferred embodiment, as shown in FIG. 1 and FIG. 2 of the drawings, the two resilient mounting devices 23 are provided at the two inner sides of the two auxiliary lenses 21 respectively for locking with the primary bridge 13 of the primary spectacles frame 10 so as to securely mount the shelter frame 20 on the primary spectacles frame 10. The auxiliary lenses 21 can be shaded lenses supported by the shelter frame 20 to form detachable sunglasses.

According to the preferred embodiment as shown in FIG. 1 to FIG. 2 of the drawings, the two resilient arms 231, each including a compression spring, are horizontally and rearwardly extended from the two inner sides of the shelter frame 20 respectively, i.e. the two root portions of the shelter bridge 22. Each of the resilient arms 231 has a front end attaching to the respective root portion of the shelter bridge 22 by welding, and a rear end connecting to the respective engaging member 232. Therefore, the resilient arms 231 will normally pull the shelter frame 20 and the engaging members 232 together so as to retain a shortest distance between the shelter frame 20 and the primary spectacle frame 10, as shown in FIG. 3 of the drawings.

Accordingly, the two resilient arms 231 will pull the two engaging members 232 to urge against the rear surfaces of the lenses 12 of the primary spectacles frame 10, so as to securely engage the two engaging members 232 with the primary spectacles frame 10. Furthermore, the resilient arms 231 are adapted for bending in an upward and a downward direction, so as to self-adjust the engaging members 232 to lock up with the two lenses 12. Preferably, the compression spring of each of the resilient arms 231 has a diameter gradually decreasing from a mid-portion thereof to two ends of the compression spring so as to enhance the elasticity of the resilient arms 231.

Thus, the resilient mounting devices 23 of the shelter frame 20 of the present invention not only firmly attaches the shelter frame 20 in front of the primary spectacles frame 10 by applying urging pressure on the primary bridge 13 in horizontal direction, but also minimizes a gap between the primary spectacles frame 10 and the shelter frame 20, which will deflect the incoming light, so as to provide a better protection to the user's eyes.

It is important to point out that each of the engaging members 232 is made of plastic materials adapted for biasing against the rear surfaces of the lenses 12 in such a manner that the engaging members 232 are non-destructive to the lenses 12. As such, the lenses 12 will be kept intact while the shelter frame 20 is detachably mounted on the primary spectacles frame 10 for, say, shading sunlight.

In other words, each of the engaging members 232 is made of non-scratching material and is downwardly extended from the respective resilient arm 231 for biasing against the rear surface of the respective lens 12 so as to prevent the lens 12 from being scratched when the detachable shelter frame 20 is mounted in front of the primary spectacles frame 10.

Moreover, each of the engaging members 232 is downwardly and frontwardly, and sidewardly bent from an inner end of the respective resilient arm 231 to form an sidewardly extending C-shaped cross section, wherein the engaging member 232 is arranged to bias against the corresponding rear surface of the lenses 12 of the primary spectacles frame 10 so as to pull the shelter frame 20 towards the primary spectacles frame 10. In other words, the engaging members 232 are outwardly and inclinedly extended from the resilient arms 231 for biasing against the rear surfaces of the lenses 12 at two inner sides thereof respectively.

Thus, each of the engaging members 232 has a curved structure forming an engaging point portion 2321 for substantially biasing against the rear surface of the respective lens 12 to pull the respective lens 12 towards the auxiliary lens 21 that can minimize a distance between the lens 12 and the auxiliary lens 21.

Figure 4:
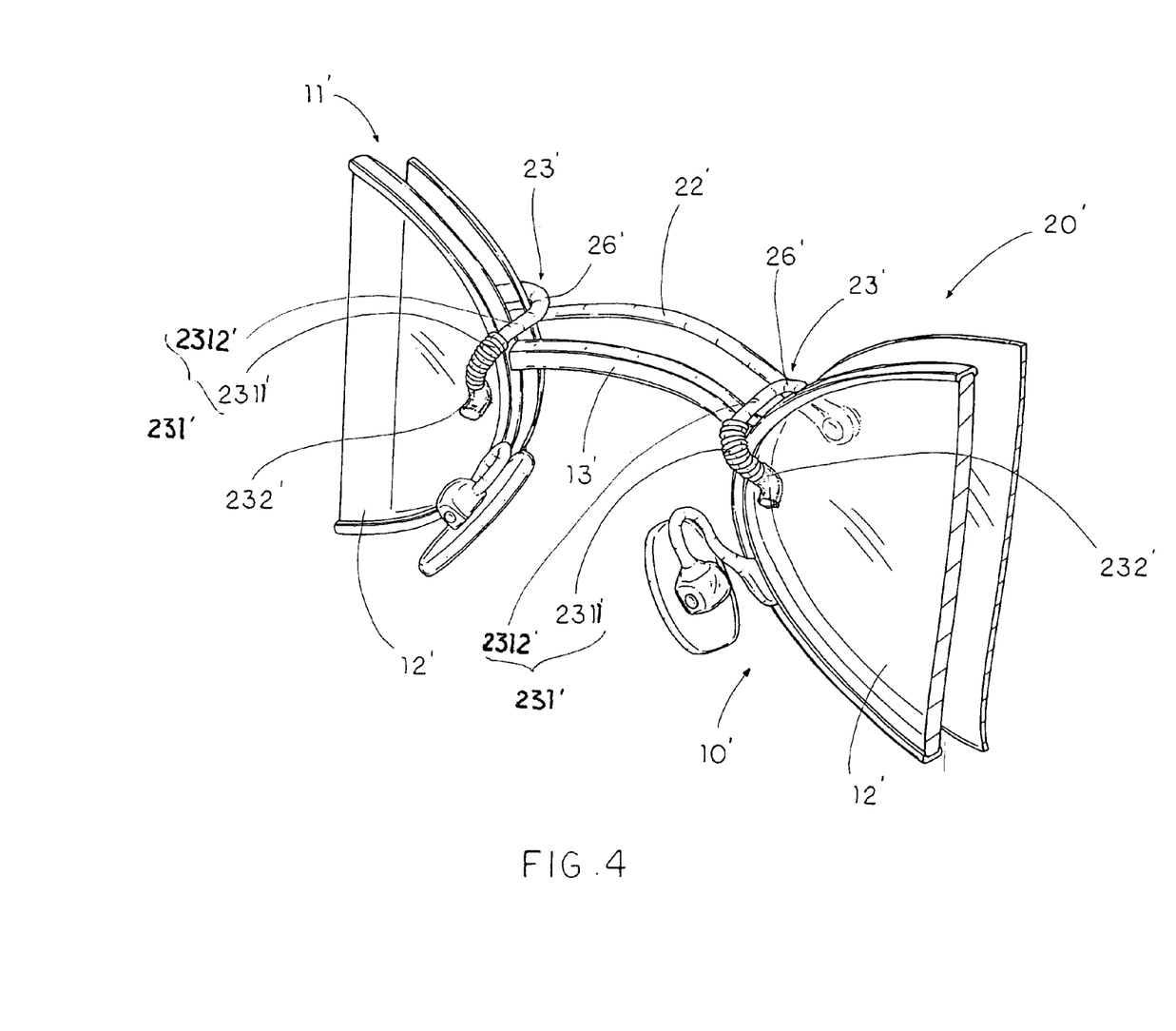
FIG. 4 is a first alternative mode of the detachable shelter frame according to the above preferred embodiment of the present invention.

Referring to FIG. 4 of the drawings, a first alternative mode of the detachable shelter frame 20' according to the preferred embodiment of the present invention is illustrated. The first alternative mode is similar to the preferred embodiment except the resilient mounting devices 23'. According to the first alternative mode, each of the resilient mounting devices 23' also comprises a resilient arm 231' and an engaging member 232'.

As in the preferred embodiment of the present invention, the resilient arm 231' is rearwardly extended from the shelter frame 20' to a rear surface of the respective lens 12' of the primary spectacles frame 10'.

The engaging member 232' is extended from the resilient arm 231' for pressing against the rear surface of the respective lens 12' of the primary spectacles frame 10' in such a manner that the two resilient arms 231' substantially pull the two engaging members 232' towards the primary spectacles frame 10' so as to apply an urging pressure against the primary spectacles frame 10' for holding the frame body 11' of the primary spectacles frame 10' between the shelter frame 20' and the engaging members 232', so as to securely mounting the shelter frame 20' in front of the primary spectacles frame 10'.

Referring to FIG. 4 of the drawings, the resilient arms 231' are made of elastic elements, such as a spring, and rearwardly extended from the two inner sides of the shelter frame 20', i.e. the root portions of the shelter bridge 22'. Each of the resilient arms 231' has a front extension portion 2311' attaching to the respective root portion of the shelter bridge 22' by welding, and a rear spring portion 2312' connecting to the respective engaging member 232'. Therefore, the resilient arms 231' will normally pull the shelter frame 20' and the engaging members 232' together to retain a shortest distance between the shelter frame 20' and the primary spectacles frame 10'.

On the other hand, the engaging members 232' is preferred to be made of or coated with non-scratching materials and downwardly extended from the resilient members 231' respectively for biasing against rear surfaces of the lenses 12' of the primary spectacles frame 10'.

Thus, the resilient mounting devices 23' of the shelter frame 20' not only firmly attaches the shelter frame 20' in front of the primary spectacles frame 10' by applying urging pressure on the primary bridge 13' in horizontal direction, but also minimizes a gap between the primary spectacles frame 10' and the shelter frame 20', which will deflect the incoming light, so as to provide a better protection to the user's eyes.

Moreover, the detachable shelter frame 20' further comprises two guiding arms 26' rearwardly and spacedly extended from the shelter bridge 22' to couple with the resilient arms 231' at the rear surfaces of the lenses 12' respectively, wherein the engaging members 232' are mounted at two free ends of the resilient arms 231' such that the two resilient arms 231' pull the two engaging members 232' for urging against the rear surfaces of the primary bridge 13' so as to securely engage the two engaging members 232' with the rear surfaces of the lenses 12' of the primary spectacles frame 10'from behind so as to mount the detachable shelter frame 20' in front of the primary spectacles frame 10'.

Figure 5:
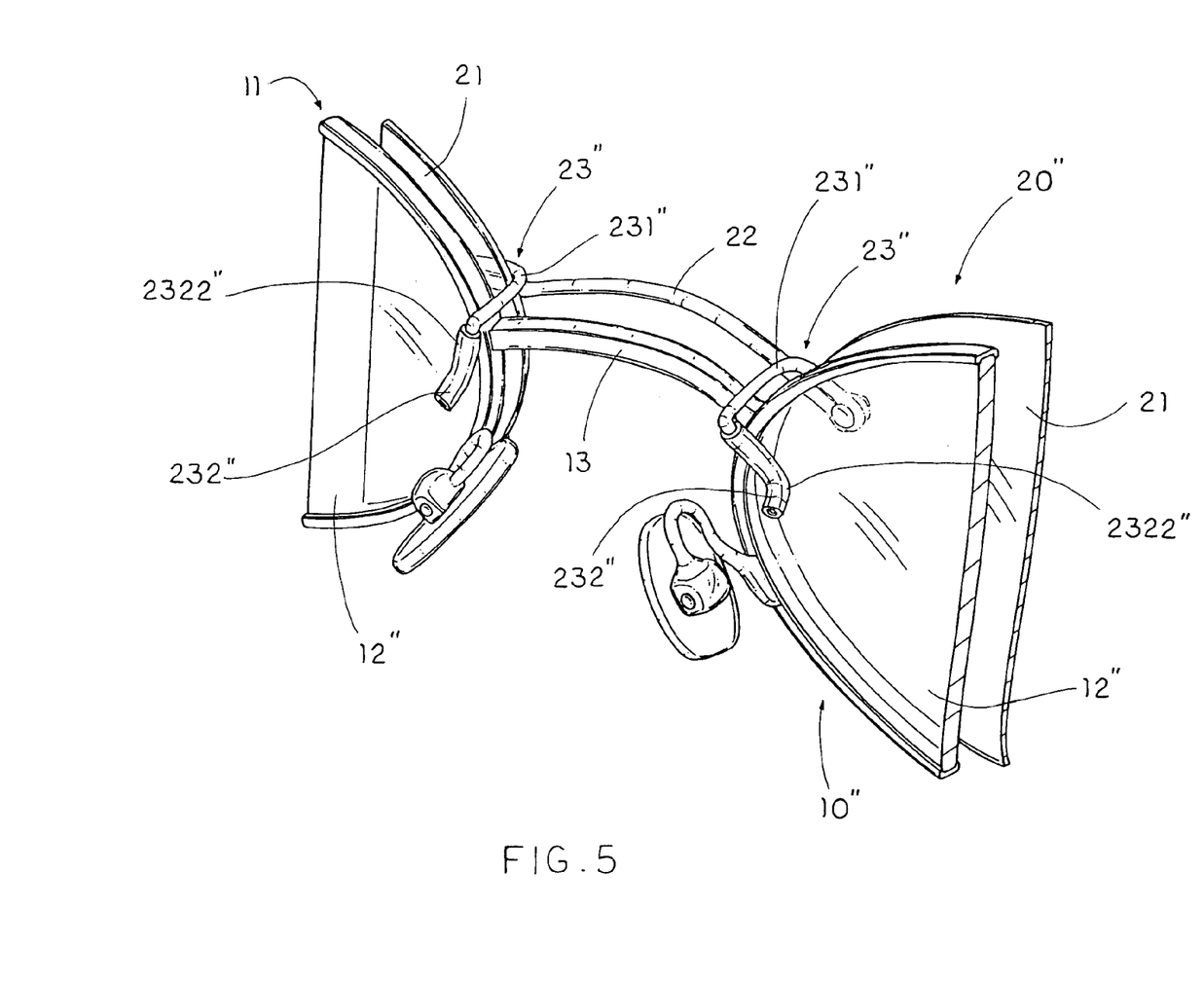
FIG. 5 is a second alternative mode of the detachable shelter frame according to the above preferred embodiment of the present invention.

Referring to FIG. 5 of the drawings, a second alternative mode of the detachable shelter frame 20" according to the preferred embodiment of the present invention is illustrated. The second alternative mode is similar to the preferred embodiment except the resilient mounting devices 23". According to the second alternative mode, both the resilient arm 231" and the engaging member 232" are made of a kind of resilient material having a predetermined elasticity for retaining the detachable shelter frame 20" on the primary spectacles frame 10" in the similar manner as in the preferred embodiment. As a result, the engaging members 232" are embedded by plastic protective tubes 2322" for preventing scratching to the lenses 12".

Moreover, each of the engaging members 232" is embedded by a tubular sleeve 2322" that is the protective tube encircling with the respective engaging member 232" for biasing against the rear surface of the respective lens 12" so as to prevent the lens 12"from being scratched when the detachable shelter frame 20" is mounted in front of the primary spectacles frame 10".

Figure 6:
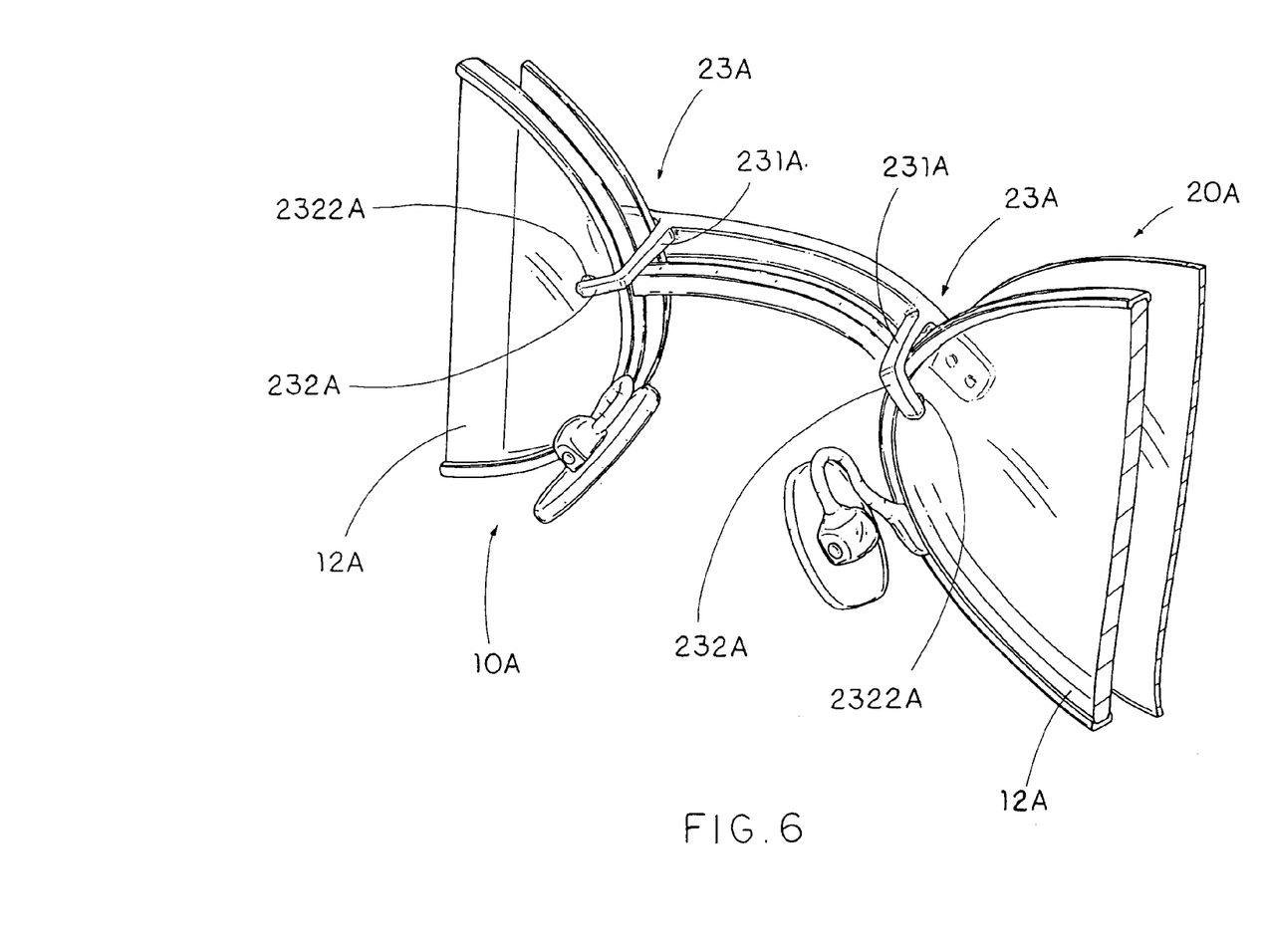
FIG. 6 is a third alternative mode of the detachable shelter frame according to the above preferred embodiment of the present invention.

Referring to FIG. 6 of the drawings, a third alternative mode of the detachable shelter frame 20A according to the preferred embodiment of the present invention is illustrated. The third alternative mode is similar to the preferred embodiment except the resilient mounting devices 23A. According to the third alternative mode, each of the resilient arms 231A has a L shape and each of the engaging member 232A is outwardly and integrally extended from the corresponding resilient arm 231A to bias against the rear surface of the corresponding lenses 12A of the primary spectacles frame 10A. Both the resilient arm 231A and the engaging member 232A can be made of plastic materials having a predetermined elasticity for retaining the detachable shelter frame 20A on the primary spectacles frame 10A in the similar manner as in the preferred embodiment.

As a result, each of the engaging members 232A has an engaging point portion 2322A protruded a distal end of the respective resilient arm 231A for biasing against the rear surface of the respective lens 12A so as to prevent the lens 12A from being scratched when the detachable shelter frame 20A is mounted in front of the primary spectacles frame 10A.

Figure 7:
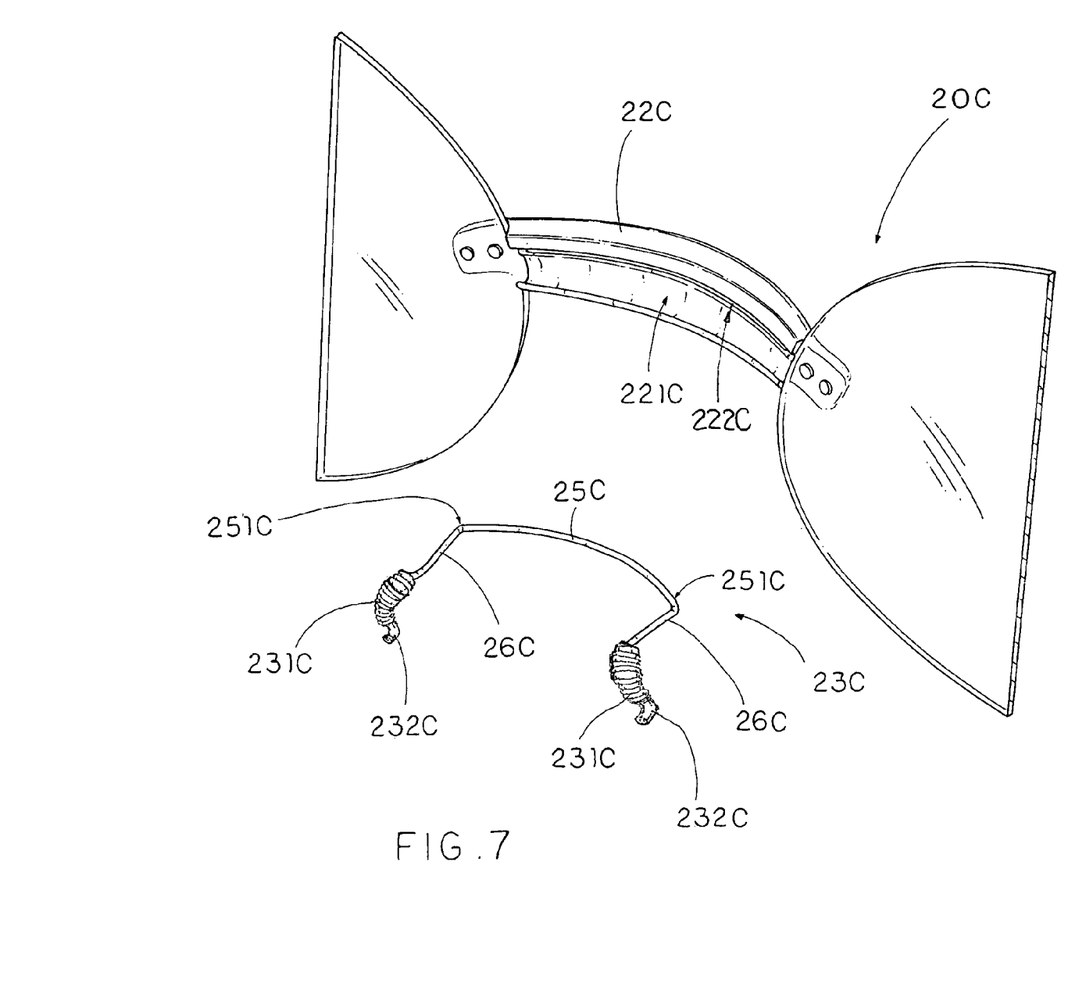
FIG. 7 is a fourth alternative mode of the detachable shelter frame according to the above preferred embodiment of the present invention.
Figure 8:
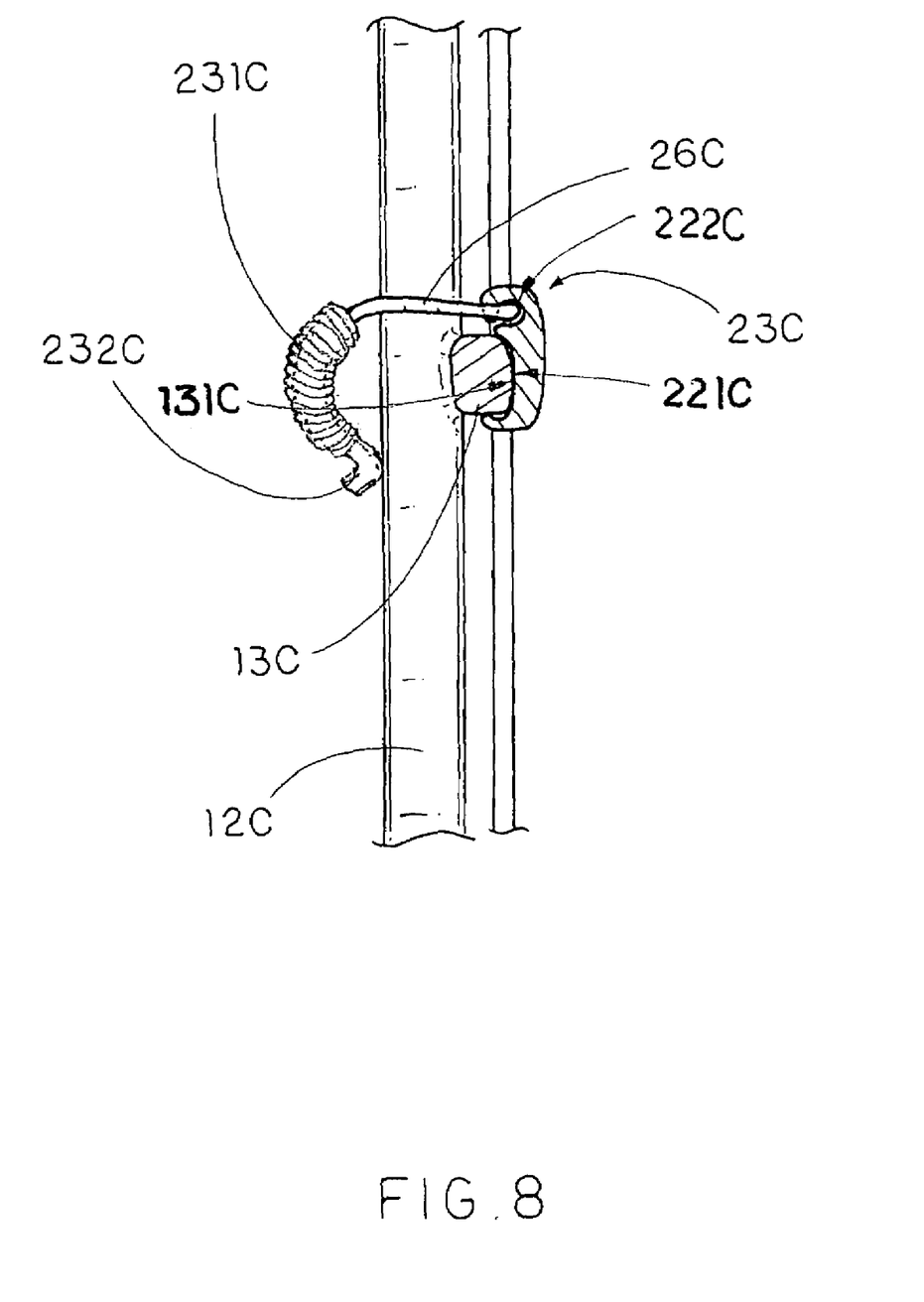
FIG. 8 is sectional side view of the detachable shelter frame according to the above fourth alternative of the preferred embodiment of the present invention.

Referring to FIG. 7 to FIG. 8 of the drawings, a fourth alternative mode of the detachable shelter frame 20C according to the preferred embodiment of the present invention is illustrated. The fourth alternative mode is similar to the preferred embodiment except the shelter bridge 22C and the resilient mounting devices 23C. According to the fourth alternative mode, the shelter bridge 22C, which is made of flexible material, has an elongated retention groove 221C extended along a rear side thereof for receiving a front side 131C of the primary bridge 13C at a position that a front bottom edge of the primary bridge 13C is engaged with the retention groove 221C so as to retain the detachable shelter frame 20C in front of the primary spectacles frame 10.

Moreover, the detachable shelter frame 20C further comprises a retention arm 25C, which is attached along the shelter bridge 22C by embedding into a retention slot 222C provided along the shelter bridge 22C, has two side ends 251C extended to the resilient arms 231C respectively, such that the shelter bridge 22C not only securely holds the two resilient mounting devices 23C in position for engaging with the lenses 12C respectively but also substantially engages with the primary bridge 13C to retain the detachable shelter frame 20C in position.

According to the fourth alternative mode of the present invention, the detachable shelter frame 20C further comprises two guiding arms 26C rearwardly and spacedly extended from the shelter bridge 22C to couple with the resilient arms 231C at the rear surfaces of the lenses 12C respectively, wherein the engaging members 232C are mounted at two free ends of the resilient arms 231C such that the two resilient arms 231C pull the two engaging members 232C for urging against the rear surfaces of the primary bridge 13C so as to securely engage the two engaging members 232C with the rear surfaces of the lenses 12C of the primary spectacles frame 10 from behind so as to mount the detachable shelter frame 20C in front of the primary spectacles frame 10.

It is worth mentioning that each of the resilient arms 231C may be embodied as an elongated elastic wire integrally, outwardly and inclinedly extended from the guiding arms 26C for biasing against the rear surfaces of the lenses 12C at two inner sides thereof respectively.

Alternatively, each of the resilient arms 231C may also be made of plastic having a predetermined elastic ability rearwardly extended from the shelter bridge 22C, wherein each of the engaging members 232C is integrally and downwardly extended from the respective resilient arm 231C such that the two resilient arms 231C pull the two engaging members 231C for urging against the rear surfaces of the lenses 12C to securely engage the two engaging members 231C with the rear surfaces of the lenses 12C of the primary spectacles frame 10 from behind so as to mount the detachable shelter frame 20C in front of the primary spectacles frame 10.

From the forgoing descriptions, it can be shown that the above mentioned objects have been substantially accomplished. The present invention effectively provides a detachable shelter frame 20 for a primary spectacles frame 10, wherein the detachable shelter frame 20 can be precisely and easily attached on a primary spectacles frame 10 by a resilient mounting device 23 so as to securely mount on the primary spectacles frame 10 without the use of any magnet and the risk of scratching the lenses 12 by the resilient mounting device 23.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A detachable shelter frame for mounting in front of a primary spectacles frame which comprises a frame body having a primary bridge mounting two lenses in position, wherein said detachable shelter frame comprises:

two auxiliary lenses;

a shelter frame for supporting said two auxiliary lenses in position, wherein said shelter frame comprises a shelter bridge extended between said two auxiliary lenses, wherein said shelter bridge, which is made of flexible material, has an elongated retention groove extended along a rear side thereof for receiving a front side of said primary bridge at a position that a front bottom edge of said primary bridge is engaged with said retention groove so as to retain said detachable shelter frame in front of said primary spectacles frame; and two resilient mounting devices spacedly provided at said shelter frame for detachably mounting said detachable shelter frame in front of said primary spectacles frame, wherein each of said resilient mounting devices comprises:

a resilient arm rearwardly extended from said shelter frame to a rear position of said respective lens of said primary spectacle frame, and an engaging member which is extended from said resilient arm for pressing against a rear surface of said respective lens of said primary spectacles frame in such a manner that said two resilient arms substantially pull said two engaging members towards said primary spectacles frame so as to apply an urging pressure against said primary spectacles frame for holding said frame body of said primary spectacles frame between said shelter frame and said engaging members, so as to securely mount said detachable shelter frame in front of said primary spectacles frame.

2. The detachable shelter frame, as recited in claim 1, further comprising a retention arm, attached along said shelter bridge, has two side ends extended to said resilient arms respectively, such that said shelter bridge not only securely holds said two resilient mounting devices in position for engaging with said lenses respectively but also substantially engages with said primary bridge to retain said detachable shelter frame in position.

3. A detachable shelter frame for mounting in front of a primary spectacles frame which comprises a frame body having a primary bridge mounting two lenses in position, wherein said detachable shelter frame comprises:

two auxiliary lenses;

a shelter frame for supporting said two auxiliary lenses in position, wherein said shelter frame comprises a shelter bridge extended between said two auxiliary lenses, wherein said shelter bridge, which is made of flexible material, has an elongated retention groove extended along a rear side thereof for receiving a front side of said primary bridge at a position that a front bottom edge of said primary bridge is engaged with said retention groove so as to retain said detachable shelter frame in front of said primary spectacles frame; and two resilient mounting devices spacedly provided at said shelter frame for detachably mounting said detachable shelter frame in front of said primary spectacles frame, wherein each of said resilient mounting devices comprises:

a resilient arm rearwardly extended from said shelter frame to a rear position of said respective lens of said primary spectacle frame, and an engaging member which is extended from said resilient arm for pressing against a rear surface of said respective lens of said primary spectacles frame in such a manner that said two resilient arms substantially pull said two engaging members towards said primary spectacles frame so as to apply an urging pressure against said primary spectacles frame for holding said frame body of said primary spectacles frame between said shelter frame and said engaging members, so as to securely mount said detachable shelter frame in front of said primary spectacles frame, wherein said engaging members are outwardly and inclinedly extended from said resilient arms for biasing against said rear surfaces of said lenses at two inner sides thereof respectively, wherein each of said engaging members having a curved structure forms an engaging point portion for substantially biasing against said rear surface of said respective lens to pull said respective lens towards said auxiliary lens so as to minimize a distance between said lens and said auxiliary lens.

4. The detachable shelter frame, as recited in claim 3, further comprising retention arm, attached along said shelter bridge, has two side ends extended to said resilient arms respectively, such that said shelter bridge not only securely holds said two resilient mounting devices in position for engaging with said lenses respectively but also substantially engages with said primary bridge to retain said detachable shelter frame in position.

5. A detachable shelter frame for mounting in front of a primary spectacles frame which comprises a frame body having a primary bridge mounting two lenses in position, wherein said detachable shelter frame comprises:

two auxiliary lenses;

a shelter frame for supporting said two auxiliary lenses in position, wherein said shelter frame comprises a shelter bridge extended between said two auxiliary lenses, wherein said shelter bridge, which is made of flexible material, has an elongated retention groove extended along a rear side thereof for receiving a front side of said primary bridge at a position that a front bottom edge of said primary bridge is engaged with said retention groove so as to retain said detachable shelter frame in front of said primary spectacles frame;

two resilient mounting devices spacedly provided at said shelter frame for detachably mounting said detachable shelter frame in front of said primary spectacles frame, wherein each of said resilient mounting devices comprises:

a resilient arm rearwardly extended from said shelter frame to a rear position of said respective lens of said primary spectacle frame, and an engaging member which is extended from said resilient arm for pressing against a rear surface of said respective lens of said primary spectacles frame in such a manner that said two resilient arms substantially pull said two engaging members towards said primary spectacles frame so as to apply an urging pressure against said primary spectacles frame for holding said frame body of said primary spectacles frame between said shelter frame and said engaging members, so as to securely mount said detachable shelter frame in front of said primary spectacles frame; and two guiding arms rearwardly and spacedly extended from said shelter bridge to couple with said resilient arms at said rear surfaces of said lenses respectively, wherein said engaging members are mounted at two free ends of said resilient arms such that said two resilient arms pull said two engaging members for urging against said rear surfaces of said primary bridge so as to securely engage said two engaging members with said rear surfaces of said lenses of said primary spectacles frame from behind so as to mount said detachable shelter frame in front of said primary spectacles frame.

6. The detachable shelter frame, as recited in claim 5, further comprising retention arm, attached along said shelter bridge, has two side ends extended to said guiding arms respectively, such that said shelter bridge not only securely holds said two resilient mounting devices in position for engaging with said lenses respectively but also substantially engages with said primary bridge to retain said detachable shelter frame in position.

* * * * *